(12) United States Patent
Theurkauf

(10) Patent No.: US 12,729,653 B2
(45) Date of Patent: Sep. 8, 2026

(54) ENVELOPED MIXTURE OF EXPERTS MODEL

(71) Applicant: RTX Corporation, Farmington, CT (US)

(72) Inventor: Charles Theurkauf, Glastonbury, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 19/041,756

(22) Filed: Jan. 30, 2025

(65) Prior Publication Data

US 2026/0218662 A1 Jul. 30, 2026

(51) Int. Cl.
*F02C 9/26* (2006.01)
*F02C 9/18* (2006.01)

(52) U.S. Cl.
CPC .................. *F02C 9/26* (2013.01); *F02C 9/18* (2013.01); *F05D 2260/81* (2013.01)

(58) Field of Classification Search
CPC ............................... F02C 9/18; F05D 2260/81
See application file for complete search history.

(56) References Cited

U.S. PATENT DOCUMENTS 11,988,105 B2 5/2024 Karnofski et al.
12,026,626 B1 7/2024 Pardeshi et al.
12,136,348 B2 11/2024 Gracia Berna et al.
2017/0175567 A1* 6/2017 Talukdar ................ G05B 13/04
2018/0204111 A1* 7/2018 Zadeh .................... G06N 3/088
2019/0017409 A1* 1/2019 Yardibi ..................... F02C 9/00

FOREIGN PATENT DOCUMENTS

CN 116662743 A 8/2023
CN 113722985 B 4/2024
EP 3690559 A1 8/2020
WO WO-2017163489 A1 * 9/2017 ................ F02C 7/00
WO 2024087128 A1 5/2024

OTHER PUBLICATIONS

Machine translation of WO 2017163489 A1; (Year: 2017).*
Extended European Search Report dated Jun. 9, 2026, in connection with European Patent Application No. 26151108.3, 11 pages.

* cited by examiner

*Primary Examiner* — Kenneth M Dunne

(57) ABSTRACT

A system for monitoring operation of a gas turbine engine comprises a plurality of expert networks each configured to generate a separate gas path parameter responsive to a separate actuator position. A router network configured to generate a weighting vector responsive to at least one ambient condition parameter. The weighting vector includes a plurality of weighting values each associated with one of the plurality of expert networks. Summing circuitry configured to apply the plurality of weighting values to each of the associated separate gas path parameters from the plurality of expert networks and sum each of the plurality of weighted separate gas path parameters from the plurality of expert networks to a weighted sum value.

20 Claims, 3 Drawing Sheets

ENVELOPED MIXTURE OF EXPERTS MODEL

TECHNICAL FIELD

This disclosure relates generally to a system and method for monitoring the health of gas turbine engines. More specifically, this disclosure relates to a system and method for monitoring the health of gas turbine engines using a series of weighted expert neural networks.

BACKGROUND

When monitoring the health of gas turbine engines there must be a comparison of the gas path parameters of the gas turbine engine to the NPSS (Numerical Propulsion System Simulation) model associated with the gas turbine engine. However, the NPSS model cannot be run in real-time due to computational limitations and complexities associated with running the NPSS model. One manner for simulating the operation of the NPSS model involves the use of a neural network. However, the neural network models are difficult to interpret and to train over the entire flight envelope of the gas turbine engine. Thus, there is a need to provide a way of simulating the operation of the NPSS in an improved manner.

SUMMARY

This disclosure relates to a system and method for monitoring the health of gas turbine engines using neural networks.

In some examples, a system for monitoring operation of a gas turbine engine includes a plurality of expert networks each configured to generate a separate gas path parameter responsive to a separate actuator position, a router network configured to generate a weighting vector responsive to at least one ambient condition parameter, where the weighting vector includes a plurality of weighting values each associated with one of the plurality of expert networks and summing circuitry configured to apply the plurality of weighting values to each of the associated separate gas path parameters from the plurality of expert networks and sum each weighted separate gas path parameter from the plurality of expert networks to a weighted sum value.

Any single one or any combination of the following features may be used with the examples above. The plurality of expert networks each may include a neural network configured to optimize operation of the gas turbine engine. The router network further may include a neural network configured to optimize operation of the gas turbine engine. The summing circuitry further may include weighting circuitry configured to apply the weighting values to an associated gas path parameter of the plurality of expert networks and summer circuitry configured to sum weighted gas path parameters to generate the weighted sum value. The summing circuitry is further configured to apply the plurality of weighting values to each of the associated separate gas path parameters from the plurality of expert networks and the lookup table and sum each weighted separate gas path parameter from the plurality of expert networks and the lookup table to a weighted sum value. The lookup table further may include a plurality of gas path parameters each associated with a particular separate actuator position. The separate actuator position may include controls for at least one of fuel flow, PLA, N1 requested, stator vane angles, bleed emissions. The at least one ambient condition parameter may include at least one of Mach number, altitude, ambient temperature, air pressure.

In other examples, a method for monitoring operation of a gas turbine engine includes generating a separate gas path parameter responsive to a separate actuator position using a plurality of expert networks, generating a weighting vector including a plurality of weighting values each associated with one of the plurality of expert networks responsive to at least one ambient condition parameter using a router network, applying the plurality of weighting values to each of the associated separate gas path parameters from the plurality of expert networks using summing circuitry, and summing each weighted separate gas path parameter from the plurality of expert networks using the summing circuitry to generate a weighted sum value.

Any single one or any combination of the following features may be used with the examples above. The step of generating the separate gas path parameters for the plurality of expert networks further may include generating the separate gas path parameters for the plurality of expert networks using a neural network for each of the plurality of expert networks configured to optimize operation of the gas turbine engine. The step of generating a weighting vector including a plurality of weighting values may include generating the weighting vector including the plurality of weighting values using a neural network for the router network configured to optimize operation of the gas turbine engine. The step of applying further may include applying the plurality of weighting values to each of the associated separate gas path parameters from the plurality of expert networks and a lookup table configured to output a second separate gas path parameter responsive to the separate actuator position. The step of summing further may include summing each weighted separate gas path parameter from the plurality of expert networks and the lookup table to generate a weighted sum value. The lookup table further may include a plurality of gas path parameters each associated with a particular separate actuator position. The separate actuator position may include controls for at least one of fuel flow, PLA, N1 requested, stator vane angles, bleed emissions. The at least one ambient condition parameter may include at least one of Mach number, altitude, ambient temperature, air pressure.

In still other examples, a system for monitoring operation of a gas turbine engine includes a plurality of expert networks each configured to generate a separate gas path parameter responsive to a separate actuator position, where the plurality of expert networks each may include a first neural network configured to optimize operation of the gas turbine engine, a router network configured to generate a weighting vector responsive to at least one ambient condition parameter, where the router network further may include a plurality of second neural networks configured to optimize operation of the gas turbine engine, where the weighting vector includes a plurality of weighting values each associated with one of the plurality of expert networks, a lookup table configured to output a separate gas path parameter responsive to the separate actuator position, where the lookup table further may include a plurality of gas path parameters each associated with a particular separate actuator position and summing circuitry configured to apply the plurality of weighting values to each of the associated separate gas path parameters from the plurality of expert networks and the lookup table and sum each weighted separate gas path parameter from the plurality of expert networks to generate a weighted sum value.

Any single one or any combination of the following features may be used with the examples above. The summing circuitry further may include weighting circuitry configured to apply the weighting values to an associated gas path parameter of the plurality of expert networks and the lookup table, and summer circuitry configured to sum weighted gas path parameters to generate the weighted sum value. The separate actuator position may include controls for at least one of fuel flow, PLA, N1 requested, stator vane angles, bleed emissions. The at least one ambient condition parameter may include at least one of Mach number, altitude, ambient temperature, air pressure.

Other technical features may be readily apparent to one skilled in the art from the following figures, descriptions, and claims.

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

FIGS. 1 through 4, described below, and the various embodiments used to describe the principles of the present disclosure are by way of illustration only and should not be construed in any way to limit the scope of this disclosure. Those skilled in the art will understand that the principles of the present disclosure may be implemented in any type of suitably arranged device or system.

As noted above, when monitoring the health of gas turbine engines there must be a comparison of the gas path parameters of the gas turbine engine to the NPSS (Numerical Propulsion System Simulation) model associated with the gas turbine engine. However, the NPSS model cannot be run in real-time due to computational limitations and complexities associated with running the NPSS model. One manner for simulating the operation of the NPSS model involves the use of a neural network. However, the neural network models are difficult to interpret and to train over the entire flight envelope of the gas turbine engine. Thus, there is a need to provide a way of simulating the operation of the NPSS in an improved manner. This disclosure provides systems and methods for monitoring the health of gas turbine engines using neural networks.

Figure 1:
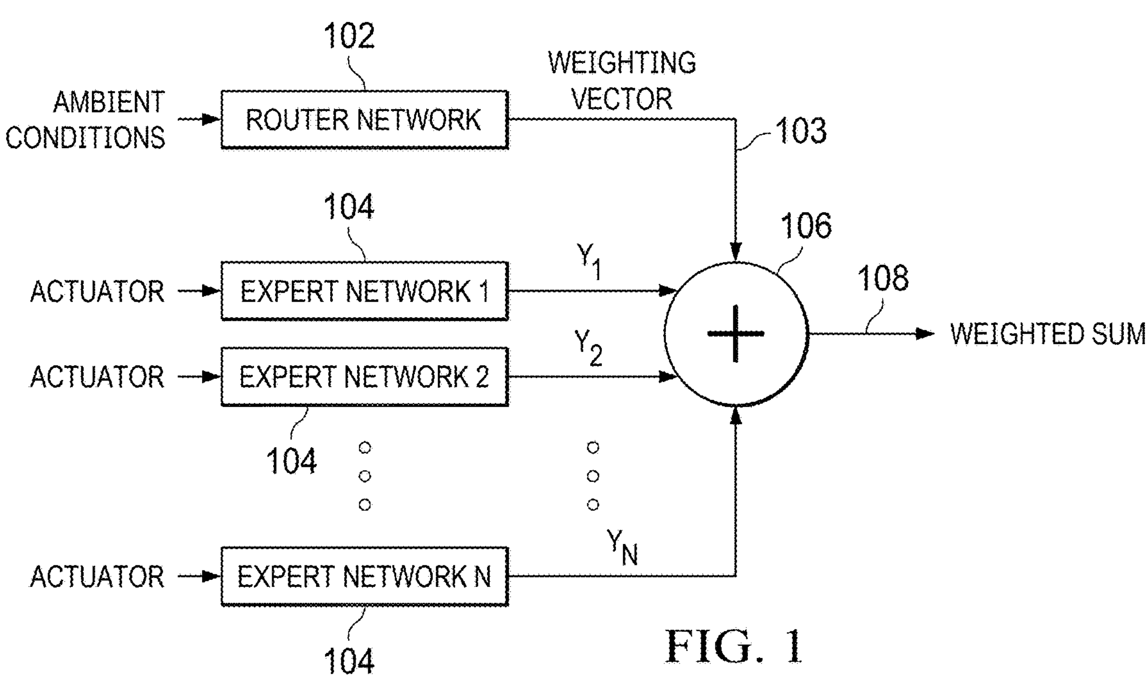
FIG. 1 illustrates a block diagram of a system for monitoring gas turbine engine operation using a first neural network for generating weighting values with respect to a plurality of expert neural networks that generate outputs of gas path parameters.

FIG. 1 illustrates a block diagram of a system for monitoring gas turbine engine operation wherein a router network 102 and a plurality of expert networks 104 monitor various engine parameters in order to determine if the gas turbine engine is operating in an optimal fashion. The router network 102 and each of the plurality of expert networks 104 comprise separate neural networks that when combined will simulate the operation of the NPSS model in a real-time fashion.

The router network 102 receives ambient conditions relating to the status of the gas turbine engine. The ambient conditions may comprise parameters such as Mach number, altitude, ambient temperature, air pressure or any other parameters that would affect the weighting of the expert network 104 outputs. The neural network comprising the router network 102 will have been previously designed to optimize the operation of the gas turbine engine performance. The neural network of the router network 102 will determine responsive to the provided ambient conditions, the particular weighting that should be applied to each of the outputs of the expert networks 104. The particular weighting that is applied to the outputs of the expert networks 104 are based upon the present operating conditions of the gas turbine engine as indicated by the ambient condition parameters and are selected by the neural network of the router network 102 to optimize the performance of the gas turbine engine. The output of the router network 102 comprises a weighting vector that includes the weighting values to be applied to each of the various outputs of the expert networks 104. The weighting vector includes only positive numbers that have a sum of its elements that are equal to 1.

The expert networks 104 each receive various actuators positions representing a gas turbine engine operating state upon which the neural networks implemented within the expert networks 104 will determine a particular output based upon the engine operation associated with the actuator. The actuator position may control parameters such as fuel flow, PLA, N1 requested, stator vane angles, bleed emissions or any other gas turbine engine actuator variable. The expert networks 104 receive the actuator position inputs and produce a predicted a gas path parameter $y_N$ responsive thereto using the neural networks comprising the expert networks.

The gas path parameter $y_N$ outputs from each of the expert networks 104 are provided to a summer circuit 106 that also receives the weighting vector 103 from the router network 102. The summer circuit 106 applies the particular weighting value from the weighting vector 103 to each of the associated gas path parameters $y_N$ form the various expert networks 104. The weighting factors provided by the weighting vector 103 will vary at particular times of gas turbine engine operation depending upon where the engine is operating within the operational envelope. Thus, the gas path parameters $y_N$ will comprise different portions of the summed weighted output 108 provided by the summer circuit 106 depending upon the current operating conditions of the gas turbine engine. While the illustration of FIG. 1 illustrates that the weighting of the gas path parameters $y_N$ occur within the summer circuit 106, it will be appreciated that separate weighting circuitry (not shown) may apply the weighting values of the weighting vector 103 to the gas path parameters $y_N$ prior to application of the gas path parameters $y_N$ to the summer circuit 106. The output of the summer circuit 106 comprising the summed weighted output 108 will vary based upon the weighting of the gas path parameters $y_N$ that are applied from each expert network 104 dependent upon the current gas turbine engine operating condition.

The implementation illustrated in FIG. 1 enables a determination of where in the flight envelope the expert networks 104 and router network 102 are performing poorly and further train those networks in order to receive better operating characteristics. The configuration enables an understanding of the dynamics of the engine changes in the flight envelope by observing the changing outputs from the router network 102.

Although FIG. 1 illustrates one example of a block diagram of a system for monitoring gas turbine engine operation, various changes may be made to FIG. 1. For example, various components and functions in FIG. 1 may be combined, further subdivided, replicated, or rearranged according to particular needs. Also, one or more additional components and functions may be included if needed or desired.

Figure 2:
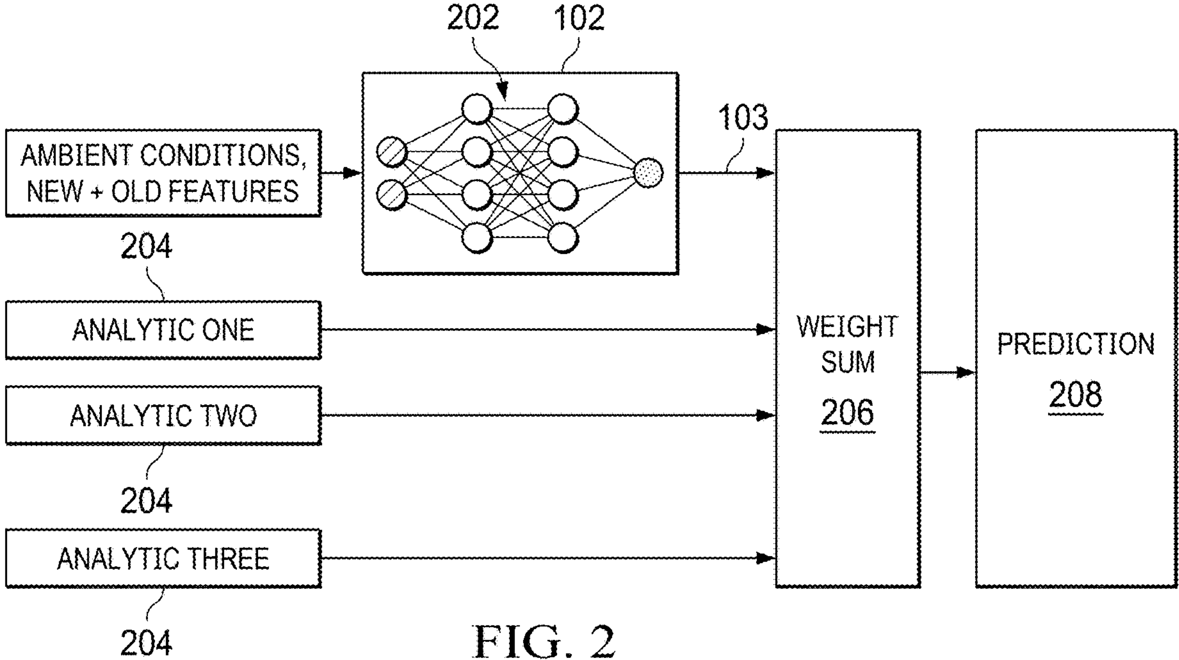
FIG. 2 illustrates an embodiment of a system for monitoring gas turbine engine operation using a router neural network and a plurality of expert neural networks.

Referring now to FIG. 2, there is illustrated an embodiment of operation of the described system. The router network 102 receives as input the ambient conditions and various old and new features with respect to the current operation of the gas turbine engine. The router network 102 utilizes the trained neural network 202 within the router network 102 in order to determine the weighting vector 103 indicating the various weighting values to be applied to the outputs of the expert networks 104. The expert networks 104 will provide various analytics 204 as outputs based upon a particular actuator position parameter provided to the expert network 104. These analytics 204 comprise the gas path parameters described previously. The analytics 204 are combined with the weighting vector 103 to provide a weighted sum 206 using the summer circuit 106 described previously. The weighted sum 206 may then provide a prediction value 208 of a current gas path parameter based upon the weighted sum 206.

Although FIG. 2 illustrates one example of operation of the described system, various changes may be made to FIG. 2. For example, various components and functions in FIG. 2 may be combined, further subdivided, replicated, or rearranged according to particular needs. Also, one or more additional components and functions may be included if needed or desired.

Figure 3:
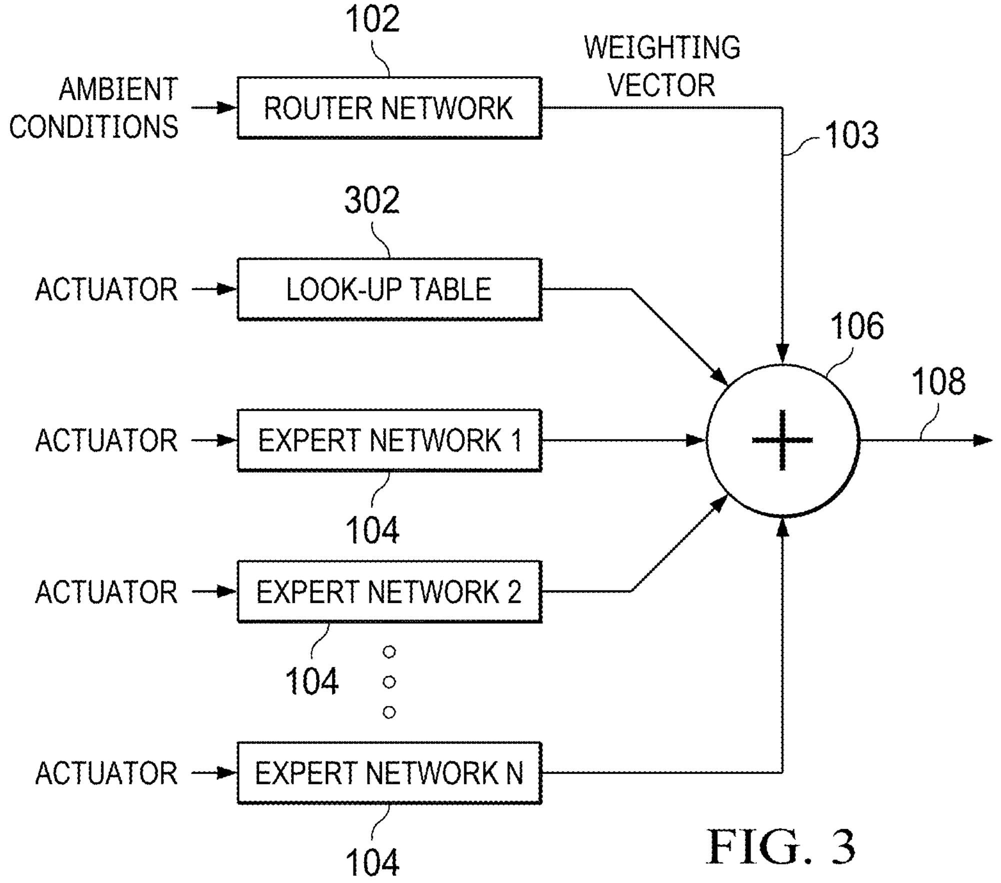
FIG. 3 illustrates an alternative embodiment of a system for monitoring gas turbine engine operation using a first neural network for generating weighting values with respect to a plurality of expert neural networks and a lookup table.

Referring now to FIG. 3, there is illustrated an alternative embodiment of the system of FIG. 1. In this embodiment, the router network 102 still receives input of the ambient conditions associated with the gas turbine engine and utilizes a neural network to generate a weighting vector 103. Also, various expert networks 104 implementing neural networks are used for generating various gas path parameters $y_N$ that comprise part of a weighted sum from a summer circuit 106. However, a lookup table 302 may also be combined with the outputs of the expert networks 104 for application to the summer circuit 106. The lookup table 302 will generate a gas path parameter $y_N$ responsive to a provided actuator position parameter. In the case of the lookup table 302, the actuator position will be used to locate a particular output value within the lookup table 302 that is indexed to the provided actuator position value. The lookup table 302 would prove useful in situations where the lookup table is accurate within particular operational envelopes of the gas turbine engine. In these portions of the operational envelope, the output of the lookup table 302 would have a weighting value of 1 applied thereto and the weighting values of each of the expert networks 104 would be zero such that the summed weighted output 108 would be exclusively determined from the lookup table 302. In portions of the operational envelope of the gas turbine engine where the lookup table 302 was not accurate, the weighting value of the lookup table 302 would be zero and the weighting values of each of the outputs of the expert networks 104 would be determined by the router network 102. This would enable the lookup table 302 to be utilized in portions of the operational envelope of the gas turbine engine where it was accurate and only require the training of expert networks 104 in those areas of the operational envelope where the lookup table 302 was not accurate. This would ease the training requirements for the neural networks associated with the expert networks 104 and the router network 102.

Although FIG. 3 illustrates one alternative example of a system for monitoring gas turbine engine operation, various changes may be made to FIG. 3. For example, various components and functions in FIG. 3 may be combined, further subdivided, replicated, or rearranged according to particular needs. Also, one or more additional components and functions may be included if needed or desired.

Figure 4:
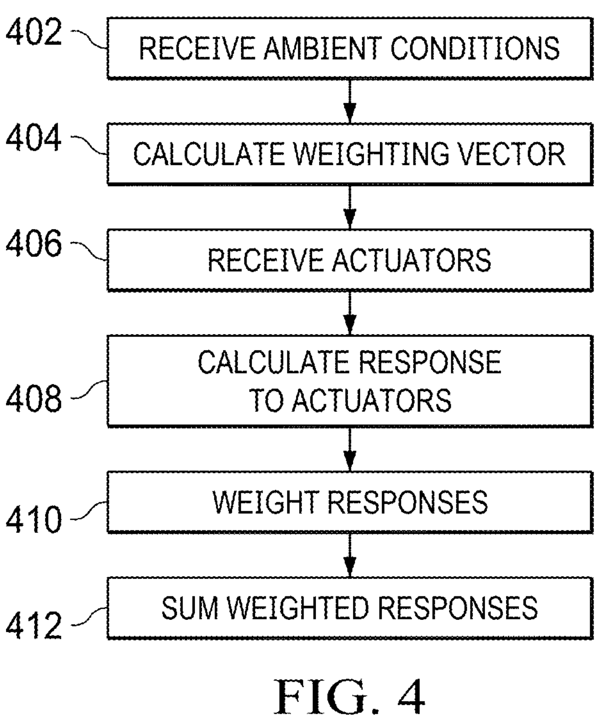
FIG. 4 illustrates a flow diagram of the operation of the systems of FIG. 2 and FIG. 3.

Referring now to FIG. 4, there is illustrated a flow diagram of the operation of the various embodiments using the router network 102, expert networks 104 and lookup tables 302 described hereinabove. Initially, the ambient conditions associated with the operation of the gas turbine engine are received by the router network 102 at step 402. The neural network within the router network 102 calculates at step 404 the weighting vector for each of the expert networks 104 and/or the lookup table 302 responsive to the received ambient conditions. The expert networks 104 and/or lookup table 302 receive the actuator positions associated with their relevant calculations at step 406. Each of the expert networks 104 will then calculate at step 408 a gas path parameter responsive to the received actuator position. In a case of an embodiment utilizing a lookup table 302, the lookup table will locate the gas path parameter value associated with the received actuator position within the lookup table. The various responses from the expert networks 104 and the lookup table 302, if used, are then weighted at step 410 in accordance with the weighted values included within the weighting vector 103 from the router network 102. Finally, the weighted responses are summed together at step 412 by the summer circuit 106 to provide the summed weighted output 108.

Although FIG. 4 illustrates one example of a flow diagram of the operation of the various embodiments of this disclosure, various changes may be made to FIG. 4. For example, while shown as a series of steps, various steps in FIG. 4 could overlap, occur in parallel, occur in a different order, or occur any number of times (including zero times).

It may be advantageous to set forth definitions of certain words and phrases used throughout this patent document. The term "couple" and its derivatives refer to any direct or indirect communication between two or more components, whether or not those components are in physical contact with one another. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present disclosure should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A system for monitoring operation of a gas turbine engine, comprising:

a plurality of expert networks each configured to generate a separate gas path parameter responsive to a separate actuator position;

a router network configured to generate a weighting vector responsive to at least one ambient condition parameter, wherein the weighting vector includes a plurality of weighting values each associated with one of the plurality of expert networks; and summing circuitry configured to apply the plurality of weighting values to each of the associated separate gas path parameters from the plurality of expert networks and sum each weighted separate gas path parameter from the plurality of expert networks to a weighted sum value.

2. The system of claim 1, wherein the plurality of expert networks each comprises a neural network configured to optimize operation of the gas turbine engine.

3. The system of claim 1, wherein the router network further comprises a neural network configured to optimize operation of the gas turbine engine.

4. The system of claim 1, wherein the summing circuitry further comprises:

weighting circuitry configured to apply the weighting values to an associated gas path parameter of the plurality of expert networks; and summer circuitry configured to sum weighted gas path parameters to generate the weighted sum value.

5. The system of claim 1 further comprising:

a lookup table configured to output a separate gas path parameter responsive to the separate actuator position; and wherein the summing circuitry is further configured to apply the plurality of weighting values to each of the associated separate gas path parameters from the plurality of expert networks and the lookup table and sum each weighted separate gas path parameter from the plurality of expert networks and the lookup table to a weighted sum value.

6. The system of claim 5, wherein the lookup table further comprises a plurality of gas path parameters each associated with a particular separate actuator position.

7. The system of claim 1, wherein the separate actuator position comprises controls for at least one of fuel flow, PLA, N1 requested, stator vane angles, bleed emissions.

8. The system of claim 1, wherein the at least one ambient condition parameter comprises at least one of Mach number, altitude, ambient temperature, air pressure.

9. A method for monitoring operation of a gas turbine engine, comprising:

generating a separate gas path parameter responsive to a separate actuator position using a plurality of expert networks;

generating a weighting vector including a plurality of weighting values each associated with one of the plurality of expert networks responsive to at least one ambient condition parameter using a router network;

applying the plurality of weighting values to each of the associated separate gas path parameters from the plurality of expert networks using summing circuitry; and summing each weighted separate gas path parameter from the plurality of expert networks using the summing circuitry to generate a weighted sum value.

10. The method of claim 9, wherein the step of generating the separate gas path parameters for the plurality of expert networks further comprises generating the separate gas path parameters for the plurality of expert networks using a neural network for each of the plurality of expert networks configured to optimize operation of the gas turbine engine.

11. The method of claim 9, wherein the step of generating a weighting vector including a plurality of weighting values further comprising generating the weighting vector including the plurality of weighting values using a neural network for the router network configured to optimize operation of the gas turbine engine.

12. The method of claim 9, wherein the step of applying further comprises applying the plurality of weighting values to each of the associated separate gas path parameters from the plurality of expert networks and a lookup table configured to output a second separate gas path parameter responsive to the separate actuator position.

13. The method of claim 12, wherein the step of summing further comprises summing each weighted separate gas path parameter from the plurality of expert networks and the lookup table to generate a weighted sum value.

14. The method of claim 12, wherein the lookup table further comprises a plurality of gas path parameters each associated with a particular separate actuator position.

15. The method of claim 9, wherein the separate actuator position comprises controls for at least one of fuel flow, PLA, N1 requested, stator vane angles, bleed emissions.

16. The method of claim 9, wherein the at least one ambient condition parameter comprises at least one of Mach number, altitude, ambient temperature, air pressure.

17. A system for monitoring operation of a gas turbine engine, comprising:

a plurality of expert networks each configured to generate a separate gas path parameter responsive to a separate actuator position, wherein the plurality of expert networks each comprises a first neural network configured to optimize operation of the gas turbine engine;

a router network configured to generate a weighting vector responsive to at least one ambient condition parameter, wherein the router network further comprises a plurality of second neural networks configured to optimize operation of the gas turbine engine, wherein the weighting vector includes a plurality of weighting values each associated with one of the plurality of expert networks;

a lookup table configured to output a separate gas path parameter responsive to the separate actuator position, wherein the lookup table further comprises a plurality of gas path parameters each associated with a particular separate actuator position; and summing circuitry configured to apply the plurality of weighting values to each of the associated separate gas path parameters from the plurality of expert networks and the lookup table and sum each weighted separate gas path parameter from the plurality of expert networks to generate a weighted sum value.

18. The system of claim 17, wherein the summing circuitry further comprises:

weighting circuitry configured to apply the weighting values to an associated gas path parameter of the plurality of expert networks and the lookup table; and summer circuitry configured to sum weighted gas path parameters to generate the weighted sum value.

19. The system of claim 17, wherein the separate actuator position comprises controls for at least one of fuel flow, PLA, N1 requested, stator vane angles, bleed emissions.

20. The system of claim 17, wherein the at least one ambient condition parameter comprises at least one of Mach number, altitude, ambient temperature, air pressure.

* * * * *